United States Patent

Gotou

Patent Number: 5,562,336
Date of Patent: Oct. 8, 1996

[54] HEAD LAMP DEVICE FOR VEHICLE

[75] Inventor: Shinichirou Gotou, Saitama-ken, Japan

[73] Assignee: Honda Giken Kogyo Kabushiki Kaisha, Tokyo, Japan

[21] Appl. No.: 472,224

[22] Filed: Jun. 7, 1995

[30] Foreign Application Priority Data

Feb. 7, 1995 [JP] Japan .................................. 7-041382

[51] Int. Cl.$^6$ .................................................. B60Q 1/08
[52] U.S. Cl. ........................... 362/37; 362/71; 362/276; 364/449
[58] Field of Search .................. 362/37, 61, 71, 362/276, 802; 364/449, 424.05; 180/168

[56] References Cited

U.S. PATENT DOCUMENTS

| | | | |
|---|---|---|---|
| 5,099,400 | 3/1992 | Lee | 362/71 |
| 5,158,352 | 10/1992 | Ikegami et al. | |
| 5,193,894 | 3/1993 | Lietar et al. | 362/276 |
| 5,247,440 | 9/1993 | Capurka et al. | 364/449 |
| 5,347,456 | 9/1994 | Zhang et al. | 180/168 |

FOREIGN PATENT DOCUMENTS 62-77249  4/1987  Japan .
2-296550  12/1990  Japan .

*Primary Examiner*—Denise L. Gromada
*Assistant Examiner*—Sara Raab
*Attorney, Agent, or Firm*—Weiner, Carrier & Burt, P.C.; Joseph P. Carrier; Irving M. Weiner

[57] ABSTRACT

A head lamp device for a vehicle in which a light distribution can be properly adjusted in response to a state of a road or a running environment and visibility can be improved is provided. The head lamp device for a vehicle capable of adjusting a lighting region in a forward direction of the vehicle comprises proper vehicle position sensing means for sensing a proper vehicle running position in a lateral direction of a road, and control means for calculating a distance from the proper vehicle running position to a center line on the road and adjusting a lighting region of the head lamp in such a way that the lighting region is expanded more and more toward the center line as the calculated distance is longer and longer.

20 Claims, 8 Drawing Sheets

HEAD LAMP DEVICE FOR VEHICLE

FIELD OF THE INVENTION

1. Background of the Invention

This invention relates to a head lamp device for a vehicle, and more particularly, a device for adjusting a lighting region of a head lamp in response to a state in a road or a traveling environment.

2. Discussion of Relevant Art

The head lamp of a vehicle is operated such that a running beam having a lighting region capable of detecting an obstacle existing at a far distance at night and a passing-by beam having a lighting region not giving any glare on an opposing vehicle when a proper or subject vehicle runs aside of the opposing vehicle are manually changed over from each other.

In addition, as a navigation system has been installed in a vehicle in recent years, there occurs an example in which a curve is estimated in advance in reference to a map information of a navigation system and an information of a position of a proper vehicle on the map, and the lighting region is changed in a lateral direction before entering the curve so as to improve visibility (Japanese Patent Laid-Open No. Hei 2-296550 (1990)).

However, in the prior navigation system described above, a radius of curvature of the curve was estimated in advance in reference to vehicle information and a light distribution control corresponding to the radius of curvature of the curve was merely carried out and a fine light distribution control corresponding to the running environment such as a road width or a circumference around the road was not performed.

SUMMARY OF THE INVENTION

The present invention has been invented in view of the foregoing and it is an object of the present invention to provide a head lamp device for a vehicle capable of performing a proper adjustment of light distribution corresponding to a state of road or a running environment and improving visibility.

In order to accomplish the aforesaid object, the present invention provides a head lamp device for a vehicle capable of adjusting a lighting region in a forward direction of the vehicle comprising proper vehicle position sensing means for sensing a proper vehicle running position in a lateral direction of a road; and control means for calculating a distance from said proper vehicle running position to a center line on the road and adjusting a lighting region of the head lamp such that the lighting region is more expanded toward the center line as said distance is longer.

In the case that a distance from a proper vehicle to a center line on the road is long, the light distribution region can be expanded up to the center line without giving a glare to an opposing vehicle to improve visibility.

The visibility can be improved in the same manner as above by providing running lane sensing means for sensing a proper vehicle running lane in a lateral direction of a road, and control means for calculating the number of lanes ranging from the running lane of said proper vehicle to a center line on a road and adjusting a lighting region of the head lamp such that the lighting region is more expanded toward the center line as the number of said lanes is increased.

There is provided steering angle sensing means for sensing a steering angle of a steering device, and said control means controls an adjusting amount for a lighting region in response to the steering angle together with the distance extending up to said center line, whereby a light distribution at the curve is finely adjusted to enable a superior visibility to be attained.

In a head lamp device for a vehicle capable of adjusting a lighting region in a forward direction of the vehicle, there are provided urban area sensing means for sensing if an area where the vehicle runs is an urban area; steering angle sensing means for sensing a steering angle of a steering device, and control means for determining an adjusting amount of the lighting region in response to said steering angle and controlling a predetermined basic non-sensitive range of the lamp to be widened when the vehicle runs in the urban area, wherein when the vehicle runs in the urban area, the light distribution is prohibited from being varied too sensitively in response to a steering wheel operation and a fine light distribution adjustment with no inharmonious feeling can be carried out.

The non-sensitive range is a range where an optical axis angle is not changed in respect to a variation of the steering angle.

A head lamp device for a vehicle capable of adjusting a lighting region in a forward direction of the vehicle comprises dwelling area sensing means for sensing if an area where the vehicle runs is a dwelling area, and control means for controlling a lateral width of the lighting region to be larger than a predetermined reference value when the vehicle runs in the dwelling area. When the vehicle runs in the dwelling area, the light distribution is widened in a lateral direction, a road edge or a walkway can be lighted up, visibility of pedestrians or the like can be improved in particular and an adjustment of the light distribution adapted for environment can be carried out.

A head lamp device for a vehicle capable of adjusting a lighting region in a forward direction of the vehicle comprises central separating area sensing means for sensing if a central separating zone for separating a lane where a proper vehicle runs from a lane for an opposing vehicle is present, and control means for adjusting an optical axis of said head lamp to an upward orientation when the vehicle runs on a road having the central separating zone so as to increase a reaching distance of the lighting region at a far side. Since in the case that the vehicle runs on the road having the central separating zone, glare on the opposing vehicle can be prohibited by the central separating zone, a far reaching distance in the lighting region can be increased and visibility can be improved.

A head lamp device for a vehicle is provided with a receiver device for receiving information transmitted from an on-road transmitter, and said road width sensing means, said sensing means for sensing the number of lanes, said urban area sensing means, said dwelling area sensing means or said central separating zone sensing means sense a road width, the number of lanes, urban area, dwelling area or central separating zone in response to information received by said receiver device, thereby the state of road or the running environment can be easily sensed and a finer adjustment of light distribution can be performed.

A head lamp device for a vehicle is provided with a map information memory device for storing map information including road data, and said road width sensing means, said sensing means for sensing the number of lanes, said urban area sensing means, said dwelling area sensing means or said central separating zone sensing means sense a road width, the number of lanes, urban area, dwelling area or central separating zone in response to information stored in said map information memory device, thereby a state of the road or the running environment can be easily detected and a finer adjustment of light distribution can be performed.

Other objects, advantages and salient features of the invention will be apparent from the following Description which, when taken in conjunction with the annexed drawings, describes the preferred embodiment of the invention.

DESCRIPTION OF THE PREFERRED EMBODIMENT

Referring now to FIGS. 1 to 9, one preferred embodiment of the present invention will be described as follows.

A vehicle 1 of the preferred embodiment is made such that a right head light 2R and a left head light 2L for lighting the front can be oscillated independently from each other in a lateral direction and a vertical direction. For example, in the FIG. 1 which is a view showing the vehicle 1 as viewed from above, the left head light 2L has an optical axis angle θL on the left side, that is, an optical axis L of the left light head 2L is deflected leftward by the angle θL in respect to a reference straight advance direction F of the vehicle 1. The optical axis of the right head light 2R is deflected rightward by an optical axis angle θR smaller than θL. As the result, a lighting region 3 in front of the vehicle made by the left and right head lights 2L, 2R has a lateral width expanded while being deflected toward the left side from the reference direction.

Figure 1:
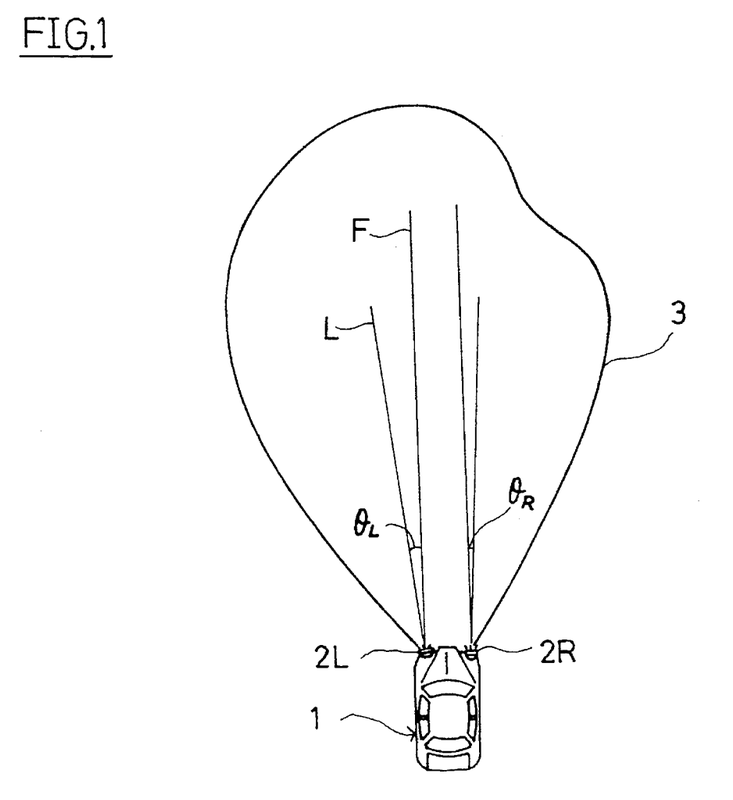
FIG. 1 is a top plan view for illustrating a light distribution state of a vehicle of one preferred embodiment of the present invention.
Figure 2:
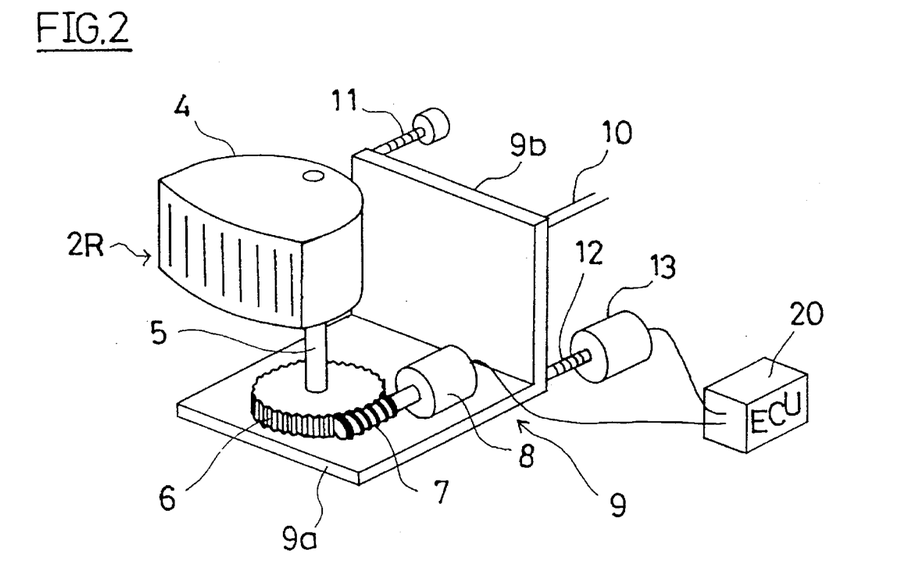
FIG. 2 is a perspective view for schematically showing an oscillating mechanism for a head light of the present preferred embodiment.

An oscillating mechanism for the head lights 2L and 2R of the preferred embodiment is schematically illustrated in FIG. 2 in reference to one head light 2R.

A supporting base 9 bent in an L-shape is oscillatably arranged at a right front end of the vehicle 1, wherein a lamp unit 4 of the head light 2R is fixed to an upper end of a rotary shaft 5 rotatably and vertically arranged on a horizontal plate 9a of the supporting base 9 and a worm gear 7 formed at a driving shaft of a motor 8 for horizontal oscillation is engaged with a worm wheel 6 fitted to the rotary shaft 5.

Accordingly, the lamp unit 4 is oscillated in a horizontal direction together with the rotary shaft 5 through engagement between the worm gear 7 and the worm wheel 6 under driving of the motor 8 for horizontal oscillation.

Within the lamp unit 4 are sprovided two kinds of filaments for a high beam for far distance lighting and a low beam for short distance lighting.

The supporting base 9 itself is oscillatably supported, wherein three shafts are extended rearward from three corners of a vertical plate 9b so as to adjust an attitude of the supporting base 9, i.e. an attitude of the lamp unit 4 by the three shafts.

One of the three shafts is a fixed shaft 10 for fixing a position of one corner of the vertical plate 9b. The other one shaft is a horizontal direction adjusting screw shaft 11. The shaft 11 can move a corner of the vertical plate 9b back and forth by being operated manually so that the supporting base 9 can be finely adjusted in a horizontal direction around the fixed point by the fixed shaft 10. The remaining lower positioned shaft is a driving screw shaft 12 of a motor 13 for vertical oscillation. The shaft 12 is driven by the motor 13 to move one corner of the vertical plate 9b back and forth so that the supporting base 9 can be adjusted in a vertical direction around the fixed point by the fixed shaft 10.

The motor 8 for horizontal oscillation and the motor 13 for vertical oscillation are controlled in their driving by a light distribution control ECU 20.

Figure 3:
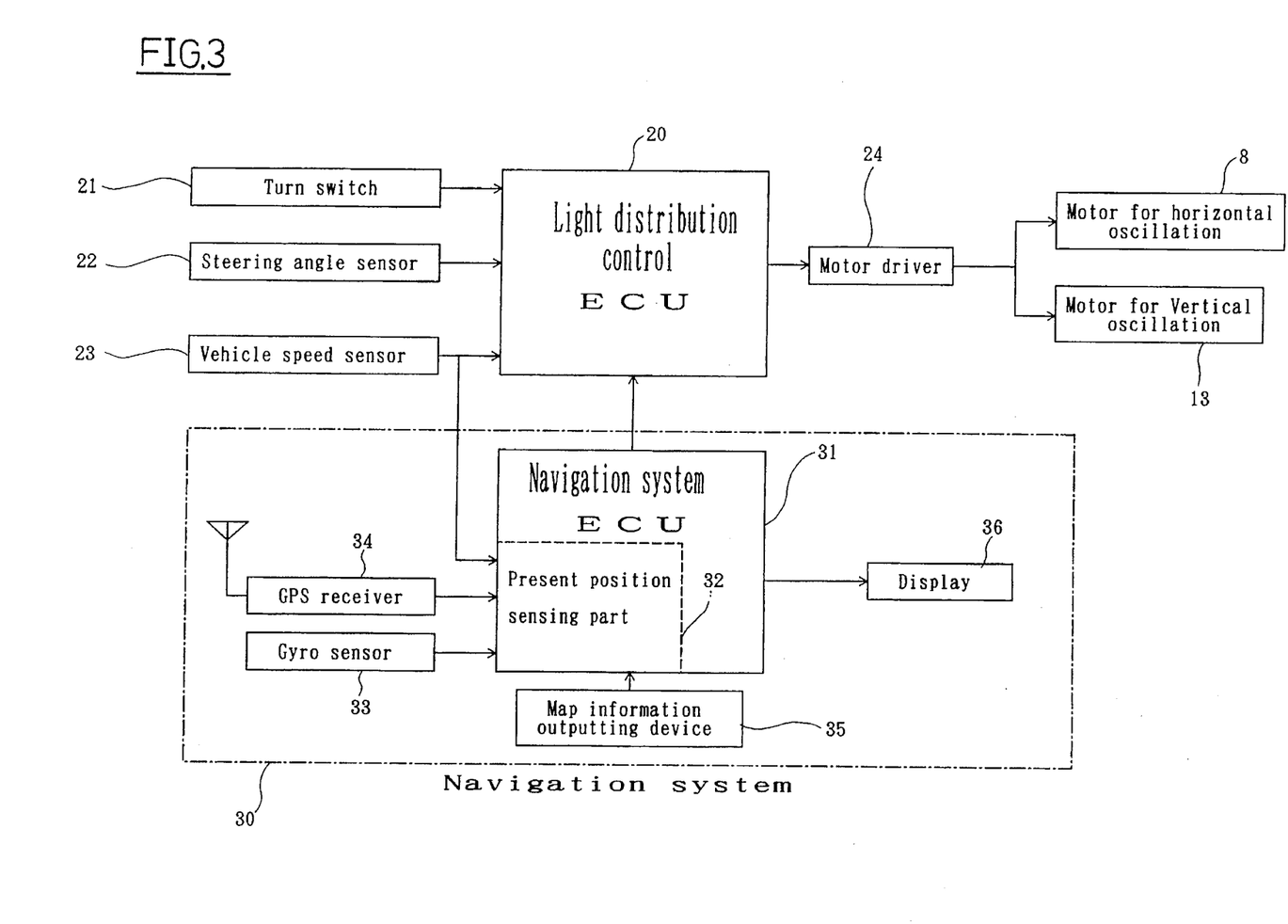
FIG. 3 is a schematic block diagram for showing a control system of the present preferred embodiment.

A schematic block diagram of a control system of the preferred embodiment is shown in FIG. 3 and described as follows.

This vehicle 1 has a navigation system 30 mounted thereon, and a light distribution control ECU 20 gets map information, information of a proper vehicle position and informations relating a state of road and a running environment from the navigation system 30. In addition, a direction indicating signal from a turn switch 21 which is turned on or off under an operation of a winker lever, a steering angle signal from a steering angle sensor 22 for sensing a direction of the steering wheel and a vehicle speed signal from a vehicle speed sensor 23 for sensing a vehicle speed are inputted to the light distribution control ECU 20. The ECU 20 processes the informations and signals so as to determine each of requisite optical axis angles θL, θR, and outputs the indicating signal to a motor driver 24 so as to get optical axis angles θL, θR. The motor driver 24 controls the motor 8 for lateral horizontal oscillation and the motor 13 for vertical oscillation in their driving operations.

The navigation system 30 will be described in brief. The navigation system ECU 31 which is a control center is operated such that the present position sensing part 32 receives sensing signals from the gyro-sensor 33 and the vehicle speed sensor 23, calculates a moving position of the vehicle, performs a map matching, corrects it at a proper vehicle position calculated in reference to a satellite electric wave received by a GPS receiver 34 so as to sense an accurate proper vehicle position.

The proper vehicle position calculated in this way is displayed at the display 36 together with the road data outputted by the map information outputting device 35.

The navigation system 30 sets many predetermined points (nodes) which can be searched in sequence along the road.

That is, the nodes set along the road on the map are arranged such that the node spacings are different from each other on a respective location and normally the spacings are wide at a straight linear road part and narrow at a curved road part, and the nodes are set at the crossing points without fail.

Various kinds of road information on a map, for example, information such as road width or state of road such as a degree of curve at the nodes and running environment around the road such as in urban or dwelling areas, for example, are stored in compliance with each of the nodes.

In addition, the navigation system 30 has a path guiding function in which the shortest path to a destination is calculated and then a vehicle is guided along the path.

Figure 4:
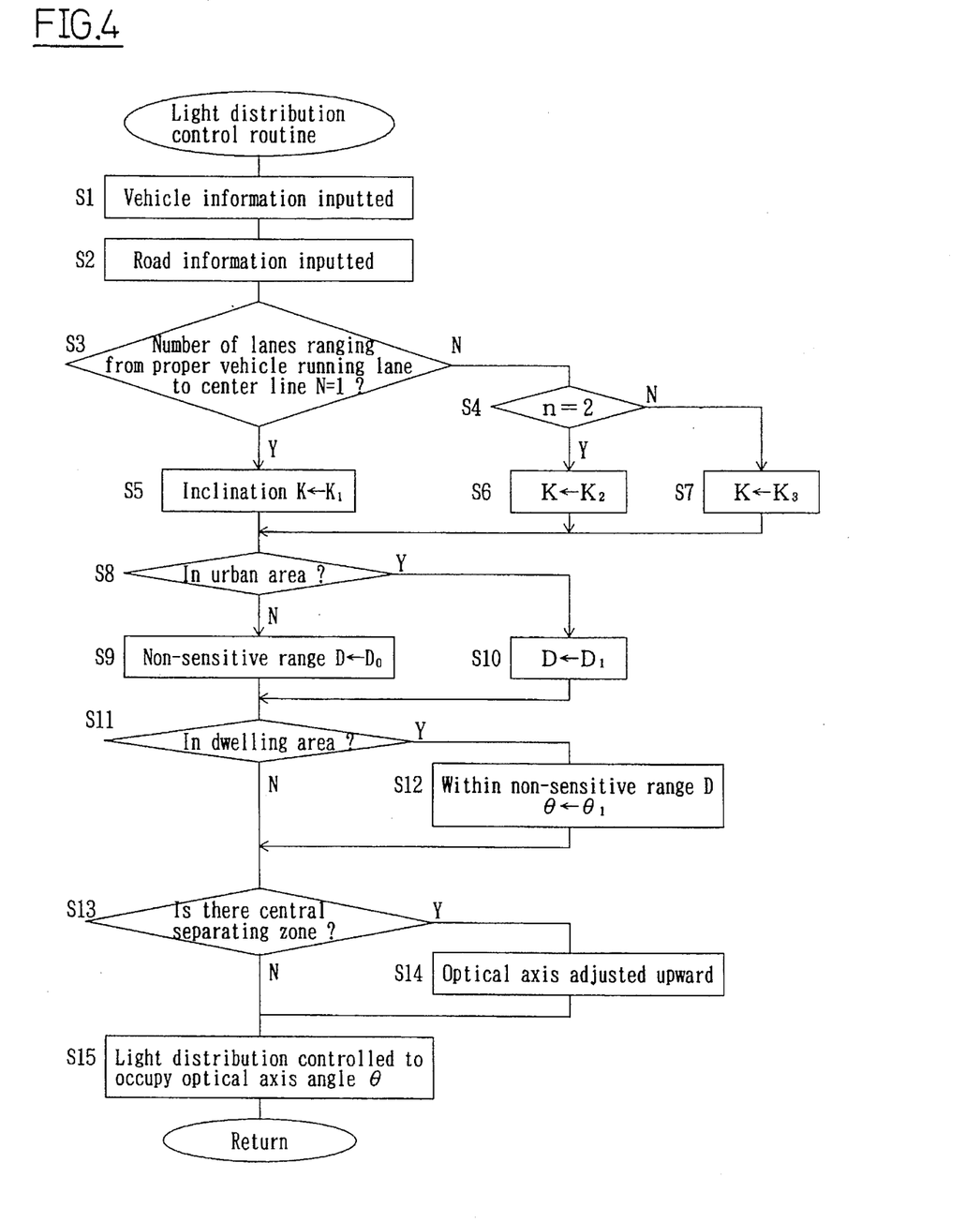
FIG. 4 is a flow chart for showing a procedure in light distribution control in the present preferred embodiment.

Referring now to the flow chart of FIG. 4, a procedure of the light distribution control in the present preferred embodiment which is control led in response to the control system above will be described.

As light distribution controls, there are provided an optical axis control in a horizontal direction for determining a relation between the steering angle $\alpha$ and an optical axis angle $\theta$ on the basis of the road information and for actually controlling a driving of the motor 8 for horizontal oscillation, and an optical axis control in a vertical direction for controlling a driving of the motor 13 for vertical oscillation.

At first, vehicle information such as a state of the turn switch 21, a steering angle detected by the steering angle sensor 22 and a vehicle speed detected by the vehicle speed sensor 23 or the like are inputted (step 1) and then the map information i.e. the road information stored for every node of the navigation system 30 are inputted (step 2).

At the next step 3, the feature of the road where the vehicle runs at present, in particular how many lanes are present in the road are judged in reference to the road information and then the number of lanes (n) ranging from the present position of the proper vehicle to the center line is judged.

When the vehicle runs on the lane which is nearest to the center line, the operation advances to step 5 with n=1, and an inclination K which is a coefficient of proportion between the optical axis angle $\theta$ and the steering angle $\alpha$ is defined as $K_1$ at step 5. If n=1 is not attained at step 3, the operation advances to step 4, and it is discriminated whether n=2 is attained, i.e. whether the vehicle runs on the second lane from the center line. If n=2 is attained at step 4, the operation advances to step 6, and an inclination K=$K_2$ is attained. If n=2 is not attained at step 4, the operation advances to step 7, and an inclination K=$K_3$ is attained. After determining the inclination K in such a way, the operation advances to step 8.

The values of the inclination K have a relation of $K_1 < K_2 < K_3$.

Figure 5A:
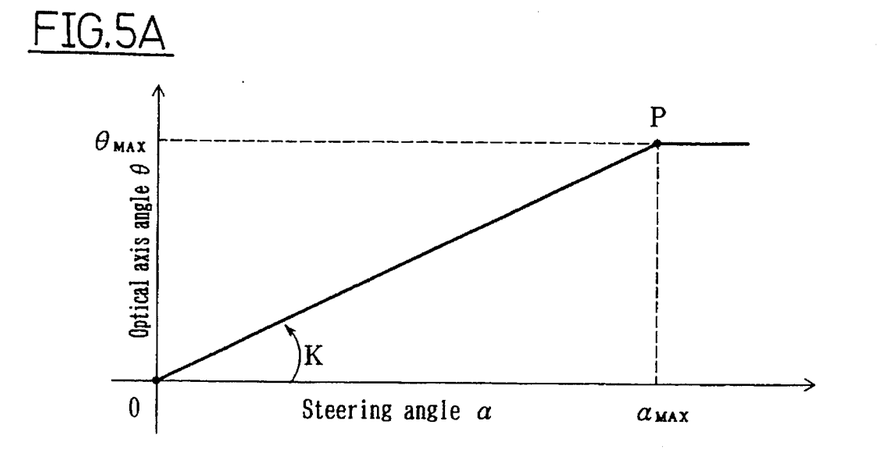
FIGS. 5A to 5C are views for showing relations between a steering angle α and an optical axis angle θ on the coordinates.
Figure 5B:
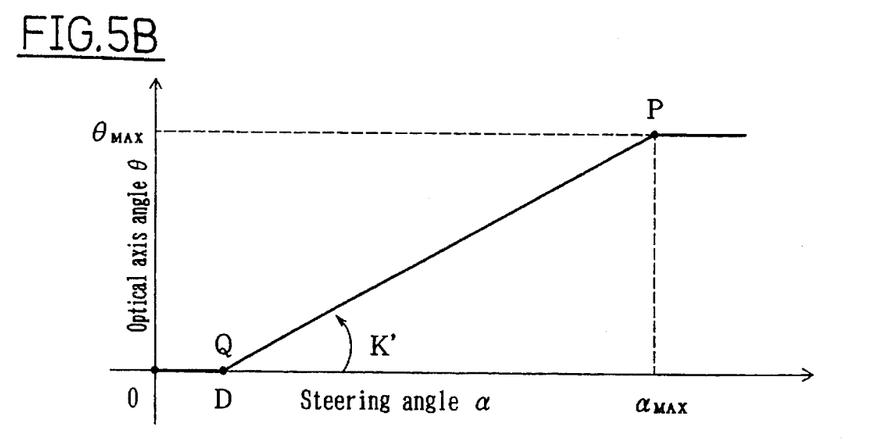
Figure 5C:
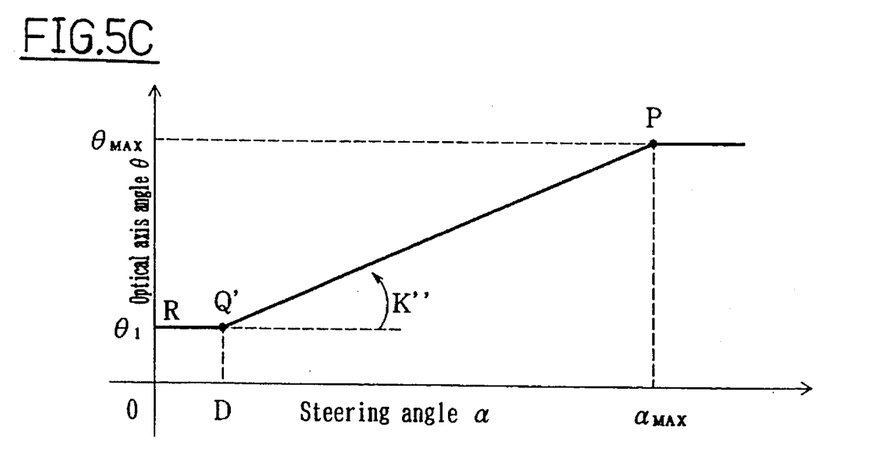

FIGS. 5A to 5C are views for showing relations of the optical axis angle $\theta$ to be controlled of the right side head light 2R with respect to the steering angle $\alpha$ with the lateral axis being the steering angle $\alpha$ and the vertical axis being $\theta$. FIG. 5A indicates a relation of both items to be determined at the aforesaid steps 3 to 7.

That is, in this case, a relation of $\theta = K\alpha$ is determined.

Accordingly, as a value of the inclination K is higher, a larger variation of the optical axis angle $\theta$ with respect to a steering angle $\alpha$ is attained.

There is a certain limitation in the optical axis angle $\theta$, and it is not controlled to be more than a maximum optical axis angle $\theta_{MAX}$. Accordingly if the inclination K is determined, a maximum steering angle $\alpha_{MAX}$ for controlling the optical axis angle $\theta$ is also determined and a control limit point $P(\alpha_{MAX}, \theta_{MAX})$ is determined.

Figure 6A:
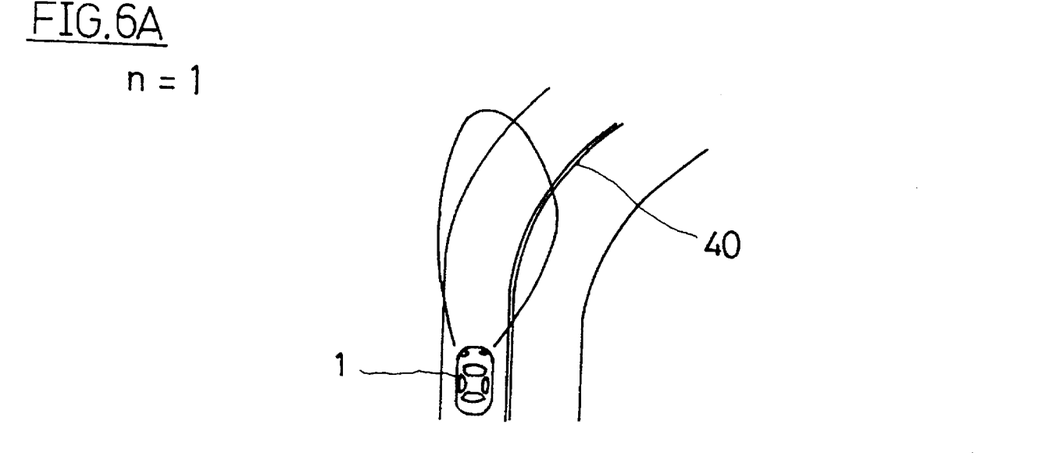
FIGS. 6A to 6C are illustrative views for showing a states in which light distributions are different from each other in view of the number of running lanes.
Figure 6B:
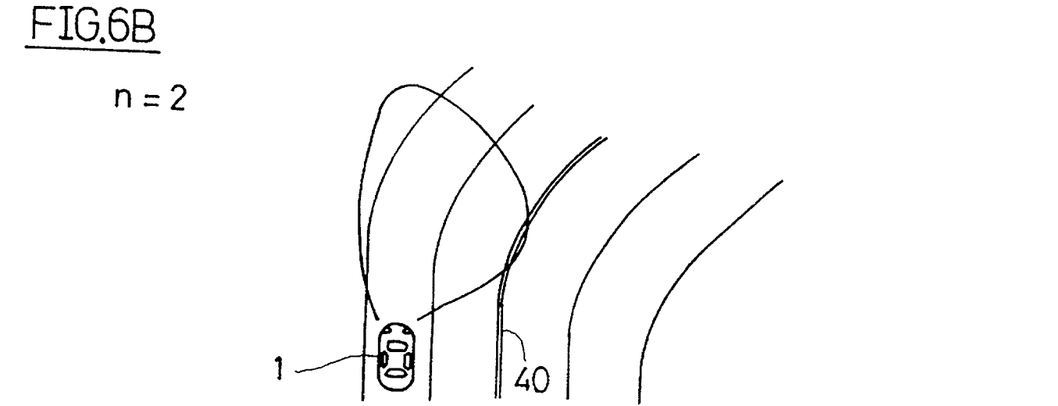
Figure 6C:
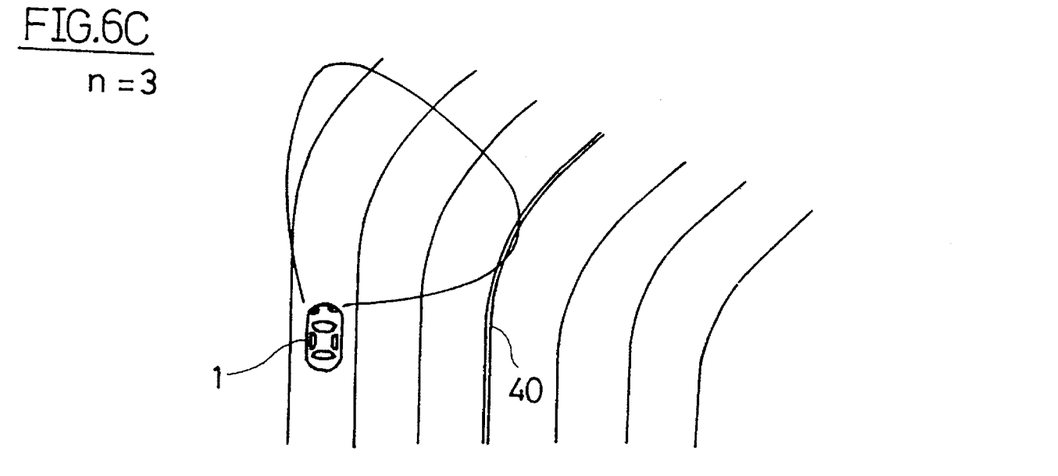

FIGS. 6A to 6C illustrate states in which light distributions are different in response to the lane where the proper vehicle runs. It is to be noted that the vehicle 1 is running under a "keep to the left" type traffic system. FIG. 6A shows a case in which the vehicle runs on the lane which is nearest to the center line 40 (n=1), FIG. 6B shows a case in which the vehicle runs on the lane which is the second from the center line 40 (n=2), and FIG. 6C shows a case in which the vehicle runs on the lane which is the third from the center line 40 (n=3). In all these cases the vehicle is approaching a rightward curve part.

In the case of n=1 (FIG. 6A) where the vehicle runs on the lane near the center line 40, the inclination K is a small value $K_{11}$, the optical axis angle $\theta$ is gradually changed in a rightward direction in response to the steering angle $\alpha$, the light distribution region is slowly deflected in a rightward direction and, therefore, it is possible to perform a suitable lighting of the advancing direction without applying any glare uselessly on an opposing vehicle by lighting toward the center line 40.

As the values of n=2, 3 are being attained, the value of inclination K is increased up to $K_2$, $K_3$, a rate of variation of the optical axis angle $\theta$ in a rightward direction in respect to the steering angle $\alpha$ is increased and as shown in FIGS. 6B and 6C, the lighting is directed rightward in a running direction at an early stage so as to light more a lane on the right side and improve a visibility of the vehicle running on the lane.

Although the inclination K determined in this case is slightly changed at a subsequent control, the aforesaid control limit point $P(\alpha_{MAX}, \theta_{MAX})$ is not changed.

After the inclination K and the control limit point $P(\alpha_{MAX}, \theta_{MAX})$ are determined as described above, the operation advances to step 8 and it is discriminated whether or not the vehicle runs on an urban area at present in reference to the road information of the navigation system.

In the case that the vehicle does not run on the urban area, but runs on a country road for example, the operation advances to step 9 and sets the non-sensitive range D to $D_0$. In the case that the vehicle runs on the urban area, the operation jumps to step 10 and sets the non-sensitive range D to $D_1$.

The non-sensitive range D defined here means a range of the steering angle $\alpha$ in which the optical axis angle is not changed and maintained in the state at the straight forward movement of the vehicle even if a steering wheel is turned.

That is, as shown in FIG. 5B, when the steering angle $\alpha$ is within the non-sensitive range D, the optical axis angle is always fixed to 0° or a specified angle and is not changed.

This is due to the fact that if the optical axis angle $\theta$ is changed immediately in reaction to any slight steering angle $\alpha$, it is annoying for a driver and at the same time provides annoyance to people around the vehicle. At urban area in particular, this state provides an inharmonious feeling, so that it is requisite that the non-sensitive region is widened, to prohibit the optical axis from being moved, as much as possible.

In view of the above, the non-sensitive range $D_1$ at the urban area is wider than the non-sensitive range $D_0$ in the country road or the like.

Figure 7:
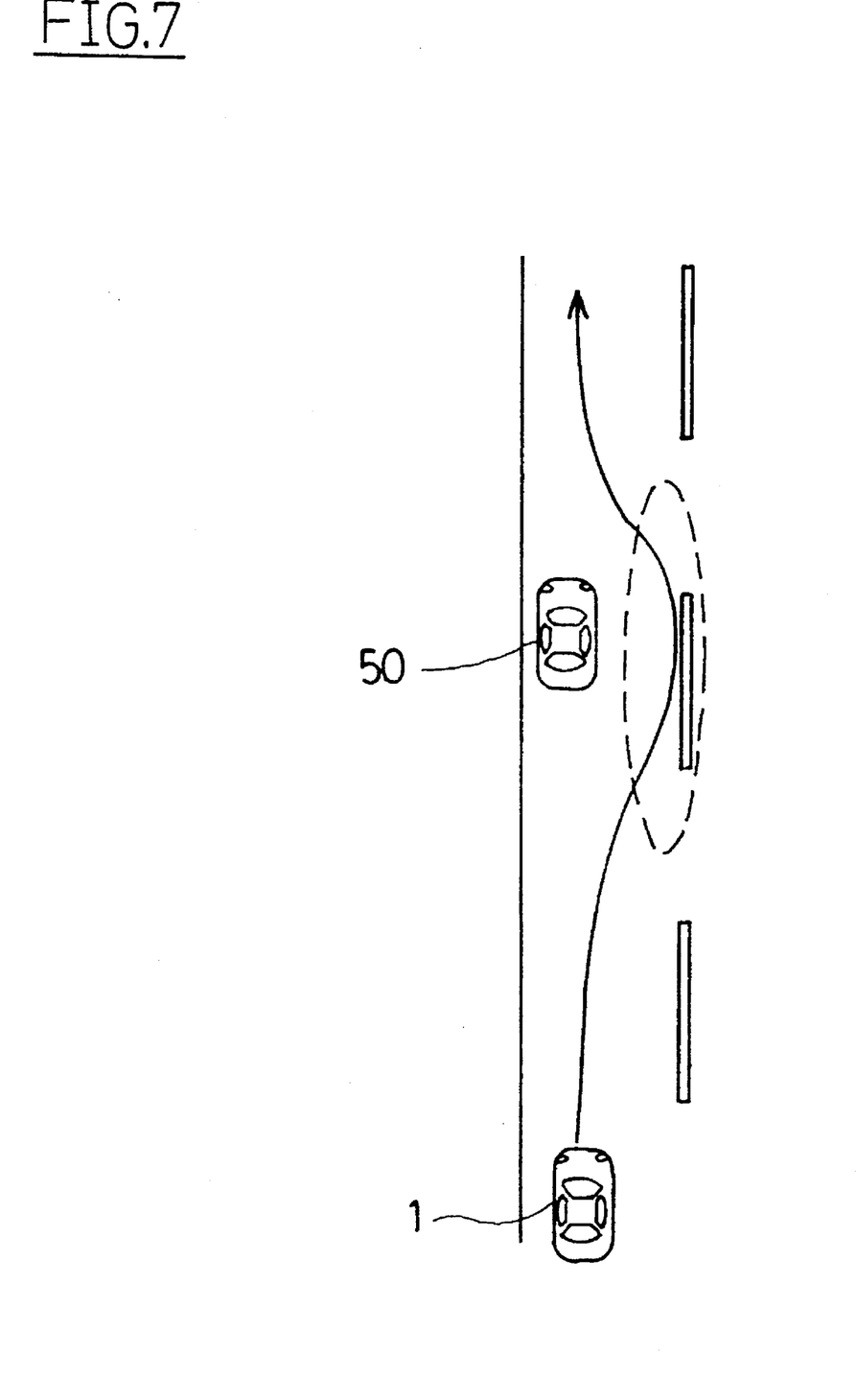
FIG. 7 is an illustrative view for showing one example to illustrate a non-sensitive range.

In the case that a steering wheel is turned in order to pass by a vehicle 50 parked at the road edge in a forward direction as shown in FIG. 7, for example, if the road is a country road a driver may not have any annoying feeling even if the optical axis angle is changed in compliance with the steering angle, and on the contrary a superior visibility can be attained because the surrounding area is dark. If the road is an urban area, changing the optical axis angle to a mere avoidance of the parked vehicle 50 is annoying and gives an inharmonious feeling. Accordingly, the optical axis angle is not changed and there is no problem in visibility even if the optical axis angle is not changed due to a bright surrounding in the urban area.

In addition, upon determination of the non-sensitive range D, the inclination K is also slightly changed as shown in FIG. 5B.

That is, a straight line QP connecting the point Q(D, 0) with the control limit point $P(\alpha_{MAX}, \theta_{MAX})$ in the coordinates in FIG. 5B becomes a control line and the inclination K is changed into an inclination K' of the straight line QP.

Since the non-sensitive range D is a quite small angle as compared with the maximum steering angle $\alpha_{MAX}$, a variation of the inclination is minute.

After determining the non-sensitive range D in this way, it is discriminated at the step 11 whether or not the vehicle runs in a dwelling region at present in reference to the road information in the navigation system. In the case that the vehicle runs in a region other than the dwelling region, the operation advances directly to step 13 and if the vehicle runs in the dwelling region, the operation advances to step 12.

In the case that the operation advances to step 12, the optical axis angle of each of the right and left head lights 2R and 2L is widened by an angle $\theta_1$ in a direction opposite to each other within the non-sensitive range D determined at the aforesaid steps 9 and 10.

Figure 8A:
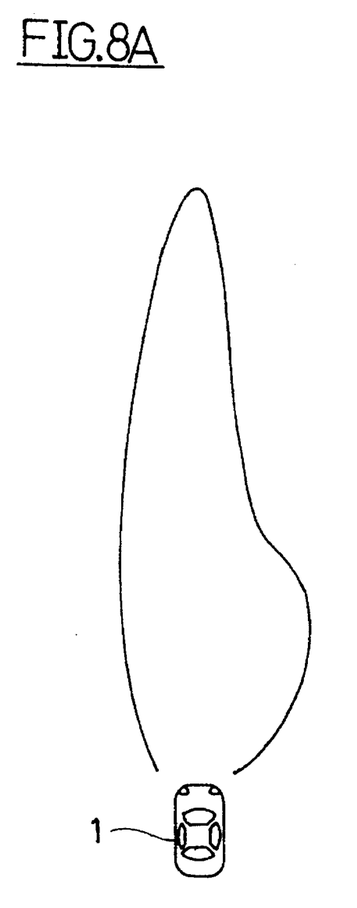
FIGS. 8A and 8B are illustrative views for showing states in which light distributions are different from each other in response to whether or not a vehicle runs in a dwelling area.
Figure 8B:
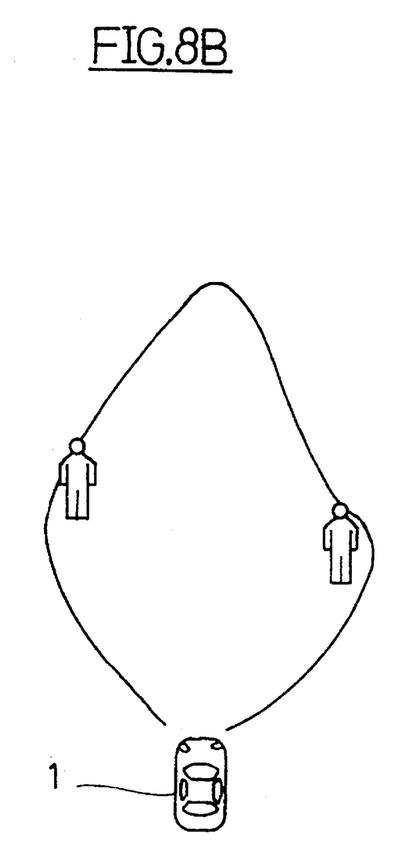

That is, in the case that the vehicle runs in a region other than the dwelling region, the light distribution is a normal one directed in the straight forward direction of the vehicle as shown in FIG. 8A, but in the case that the vehicle runs in the dwelling region, the light distribution is widened laterally as shown in FIG. 8B to light up the road edge or a walkway and to improve a visibility for walking persons in particular. Thus the light distribution adjustment adapted to the environments can be performed.

Such an expansion of the light distribution as above is carried out within the non-sensitive range D and accordingly the light distribution is expanded within the non-sensitive region D to the specified optical axis angle $\theta_1$ as shown in FIG. 5C, resulting in that the straight line RQ' connecting the point R(0, $\theta_1$) with the point Q'(D, $\theta_1$) is a control line in the non-sensitive range and the straight line Q'P connecting the point Q'(D, $\theta_1$) with the control limit point $P(\alpha_{MAX}, \theta_{MAX})$ becomes a control line for a steering angle exceeding the non-sensitive range D and its inclination is changed into K".

Though inclinations K' and K" are quite similar to each other, during running of the vehicle in the dwelling region, the optical axis angle θ is determined in respect to the steering angle α along the bent line RQ'P.

The control line determining the optical axis angle θ in respect to the steering angle α is defined through the foregoing steps, and at the next step 13, it is discriminated in reference to the road information whether or not the central separating zone is present in the running road. If there is no central separating zone, the operation advances directly to step 15 and if there is the central separating zone, the operation advances to step 14 so as to adjust the optical axis to an upward orientation.

That is, the aforesaid motor 13 for vertical oscillation is driven to oscillate the head lights 2L, 2R upward and their optical axes are directed upward.

Figure 9:
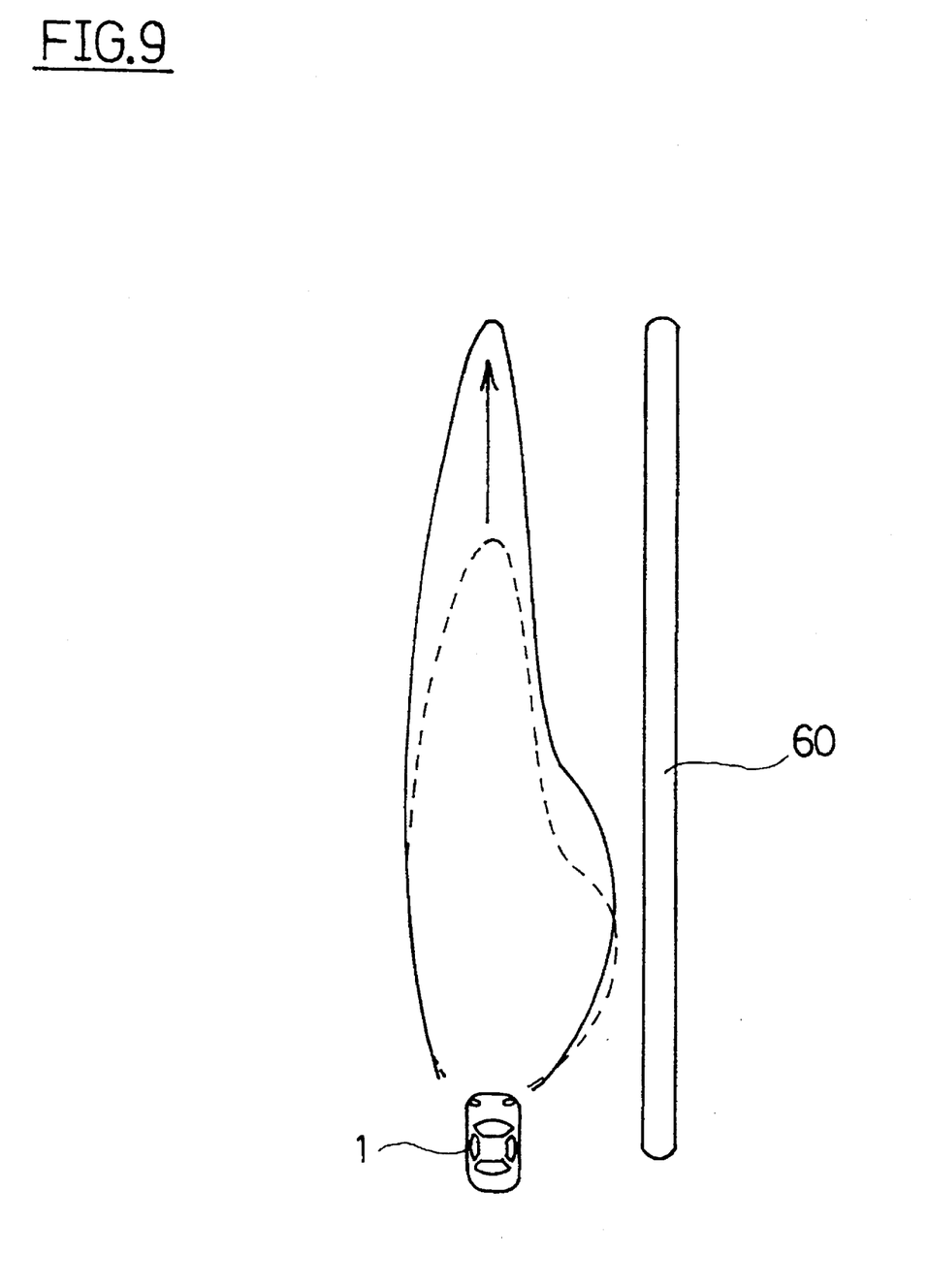
FIG. 9 is an illustrative view for showing a state in which light distributions are different from each other in response to presence or non-presence of the central separating region.

FIG. 9 is a view for showing the state of the aforesaid light distribution control, and in the case that there is no central separating zone 60, the light distribution is a normal light distribution indicated by a dotted line in FIG. 9 which is a low beam and directed downward so as not to cause any glare on a vehicle running on the opposing lane. However, when there is the central separating zone 60, the optical axis is directed upward to cause a light distribution region to be set as indicated by a solid line in FIG. 9, for even if a far reaching distance is increased to improve visibility, lighting is interrupted by the central separating zone 60 not to cause any glare on a vehicle running on the opposing lane.

As described above, adjustment of the optical axis in a vertical direction is carried out at step 14 and the actual light distribution control in a lateral horizontal direction of the optical axis on the basis of the control line determined at the aforesaid step is carried out at step 15.

As described above, the light distribution can always be adjusted properly in compliance with environment, that is, in response to the number of lanes (n) ranging from the lane where the proper vehicle runs to the center line 40, whether the vehicle runs in the urban area or dwelling area or whether or not there is a central separating zone, and the visibility can be improved.

Although the light distributing control in the aforesaid preferred embodiment is carried out by sensing the number of lanes (n) ranging from the proper vehicle running lane to the center line 40 at steps 3 to 7, it may also be possible that the distance ranging from the proper vehicle to the center line 40 is detected directly in place of the number of lanes and is applied to the light distribution control.

At this time, it is necessary to detect a running position of the proper vehicle with high accuracy and also a high accuracy navigation system is required.

In addition, in order to detect a positional relation between the road and the proper vehicle, it may also be applicable that a forward region of the proper vehicle is photographed with a camera and the photographic image is processed to detect an accurate position of the proper vehicle on the road.

This method of utilizing a camera enables the center line to be detected, also enables a distance ranging from the accurate position of the proper vehicle on the road to the center line to be calculated, facilitates sensing of presence or non-presence of the central separating zone, and at the same time, it may be discriminated whether or not the road is in the urban area or the dwelling area.

It may also be applicable that whether or not the area is an urban area is discriminated by detecting an amount of light in a forward region with an optical sensor.

In addition, whether or not the area is in a dwelling area can be discriminated by sensing a temperature around it with an infrared ray sensor or the like so as to discriminate a presence of walking persons and in the case that many walking persons can be detected, it can be discriminated that the area is a dwelling area.

In addition, the road information is attained from the navigation system in the aforesaid preferred embodiment, an inter-road-vehicle information communicating system in which each of the vehicles has a receiver mounted therein and information is obtained from beacons (on-road transmitters) installed along the road can be utilized, resulting in that more detailed information can be attained and a more fine light distribution control in compliance with environment becomes possible.

In the present invention, a distance ranging from a proper vehicle running position detected by a proper vehicle position sensing means to the center line on the road is calculated, and the lighting region of the head lamp is adjusted to expand to the center line side more and more as the distance is longer. Therefore, in the case that a distance ranging from the proper vehicle to the center line on the road is long, the lighting region can be expanded up to the center line without applying any glare on an opposing vehicle for improving visibility.

The visibility can be similarly improved by calculating the number of lanes ranging from the proper vehicle running lane to the center line on the road and adjusting the lighting region of the head lamp so as to expand the lighting region toward the center line as the number of lanes is increased.

There is provided a steering angle sensing means for sensing a steering angle of a steering device, the control means controls an amount of adjustment of the lighting region in response to the steering angle together with a distance extending up to the center line, thereby the light distribution control at the curve is adjusted more finely to enable a superior visibility to be attained.

Since a predetermined reference non-sensitive range is controlled to be expanded, when the vehicle runs in an urban area, the light distribution is prohibited from being changed sensitively in reaction to a steering wheel operation to enable a fine light distribution adjustment to be carried out while any inharmonious feeling is eliminated.

Since a lateral width of the lighting region is controlled to be wider than a predetermined reference value when the vehicle runs in the dwelling area, the light distribution can be expanded laterally to light up the road edge or the walkway and to improve a visibility for walking persons in particular and thus a light distribution adjustment suitable for environment can be performed.

When the vehicle runs on the road having a central separating zone the optical axis of the head lamp is adjusted toward an upward direction and a far reaching distance in the lighting region is increased. Thus when the vehicle runs on the road having the central separating zone, the far reaching distance in the lighting region can be increased so as to improve a visibility, in view of the fact that a glare on the opposing vehicle can be prohibited to a certain degree by the central separating zone.

Although there has been described what is at present considered to be the preferred embodiment of the invention, it will be understood that modifications and variations may be made thereto without departing from the spirit and essence of the invention. The scope of the invention is indicated by the appended claims rather than the foregoing description.

What is claimed is:

1. A head lamp device for a vehicle capable of adjusting a lighting region in a forward direction of the vehicle comprising:

proper vehicle position sensing means for sensing a proper vehicle running position in a lateral direction of a road; and control means for calculating a distance from said proper vehicle running position to a center line on the road and adjusting a lighting region of the head lamp such that the lighting region is more expanded toward the center line as said distance is longer.

2. A head lamp device for a vehicle as set forth in claim 1 including steering angle sensing means for sensing a steering angle of a steering device; and said control means controls an adjusting amount for the lighting region in response to the calculated distance extending up to said center line and to said sensed steering angle.

3. A head lamp device for a vehicle as set forth in claim 2, including at least one of a receiver device for receiving information transmitted from an on-road transmitter and a map information memory device storing map information including road data, and said road width sensing means senses the road width in response to information obtained from at least one of said receiver device and said map information memory device.

4. A head lamp device for a vehicle as set forth in claim 1 including a receiver device for receiving information transmitted from an on-road transmitter, and said road width sensing means sense a road width in response to information received by said receiver device.

5. A head lamp for a vehicle as set forth in claim 1 including a map information memory device for storing map information including road data, and said road width sensing means sense a road width in response to information stored in said map information memory device.

6. A head lamp device for a vehicle as set forth in claim 1, including urban area sensing means for sensing if an area where the vehicle runs is an urban area;

steering angle sensing means for sensing a steering angle of the steering device; and said control means also determines an adjusting amount of a lighting region in response to said sensed steering angle and expands a predetermined reference non-sensitive range of the lighting region to the steering angle when the vehicle runs in the urban area.

7. A head lamp device for a vehicle as set forth in claim 6, including dwelling area sensing means for sensing if an area where the vehicle runs is a dwelling area; and said control means further controls a lateral width of the lighting region to be larger than a predetermined reference value when the vehicle runs in the dwelling area.

8. A head lamp device for a vehicle as set forth in claim 7, including central separating zone sensing means for sensing if a central separating zone for separating a lane where the proper vehicle runs from a lane where an opposing vehicle runs is present; and control means for adjusting an optical axis of said head lamp to an upward orientation when the vehicle runs on a road having the central separating zone so as to increase a far-reaching side distance of the lighting region.

9. A head lamp device for a vehicle as set forth in claim 1, including dwelling area sensing means for sensing if an area where the vehicle runs is a dwelling area; and said control means additionally controls a lateral width of the lighting region to be larger than a predetermined reference value when the vehicle runs in the dwelling area.

10. A head lamp device for a vehicle as set forth in claim 1, including central separating zone sensing means for sensing if a central separating zone for separating a lane where the proper vehicle runs from a lane where an opposing vehicle runs is present; and said control means further adjusts an optical axis of said head lamp to an upward orientation when the vehicle runs on a road having the central separating zone so as to increase a far-reaching side distance of the lighting region.

11. A head lamp device for a vehicle capable of adjusting a lighting region in a forward direction of the vehicle comprising:

running lane sensing means for sensing a proper vehicle running lane in a lateral direction of a road; and control means for calculating number of lanes ranging from the running lane of said proper vehicle to a center line on the road and adjusting a lighting region of the head lamp such that the lighting region is more expanded toward the center line as the number of said lanes is increased.

12. A head lamp device for a vehicle as set forth in claim 11 including steering angle sensing means for sensing a steering angle of a steering device; and said control means controls an adjusting amount for the lighting region in response to the calculated number of lanes and to said sensed steering angle.

13. A head lamp device for a vehicle as set forth in claim 12, including at least one of a receiver device for receiving information transmitted from an on-road transmitter and a map information memory device storing map information including road data, and said running lane sensing means senses the proper vehicle running lane in response to information obtained from at least one of said receiver device and said map information memory device.

14. A head lamp device for a vehicle as set forth in claim 11, including at least one of a receiver device for receiving information transmitted from an on-road transmitter and a map information memory device storing map information including road data, and said running lane sensing means senses the proper vehicle running lane in response to information obtained from at least one of said receiver device and said map information memory device.

15. A head lamp device for a vehicle capable of adjusting a lighting region in a forward direction of the vehicle comprising:

urban area sensing means for sensing if an area where the vehicle runs is an urban area;

steering angle sensing means for sensing a steering angle of a steering device; and control means for determining an adjusting amount of a lighting region in response to said sensed steering angle and expanding a predetermined reference non-sensitive range of the lighting region to the steering angle when the vehicle runs in the urban area.

16. A head lamp device for a vehicle as set forth in claim 15, including at least one of a receiver device for receiving information transmitted from an on-road transmitter and a map information memory device storing map information including road data, and said urban area sensing means senses the urban area in response to information obtained from at least one of said receiver device and said map information memory device.

17. A head lamp device for a vehicle capable of adjusting a lighting region in a forward direction of the vehicle comprising:

dwelling area sensing means for sensing if an area where the vehicle runs is a dwelling area; and control means for controlling a lateral width of the lighting region to be larger than a predetermined reference value when the vehicle runs in the dwelling area.

18. A head lamp device for a vehicle as set forth in claim 17, including at least one of a receiver device for receiving information transmitted from an on-road transmitter and a map information memory device storing map information including road data, and said dwelling area sensing means senses the dwelling area in response to information obtained from at least one of said receiver device and said map information memory device.

19. A head lamp device for a vehicle capable of adjusting a lighting region in a forward direction of the vehicle comprising:

central separating zone sensing means for sensing if a central separating zone for separating a lane where a proper vehicle runs from a lane where an opposing vehicle runs is present; and control means for adjusting an optical axis of said head amp to an upward orientation when the vehicle runs on a road having the central separating zone so as to increase a far reaching side distance of the lighting region.

20. A head lamp device for a vehicle as set forth in claim 19, including at least one of a receiver device for receiving information transmitted from an on-road transmitter and a map information memory device storing map information including road data, and said central separating zone sensing means senses the central separating zone in response to information obtained from at least one of said receiver device and said map information memory device.

* * * * *

UNITED STATES PATENT AND TRADEMARK OFFICE
CERTIFICATE OF CORRECTION

PATENT NO. : 5,562,336
DATED : October 8, 1996
INVENTOR(S) :
Shinichirou Gotou

It is certified that error appears in the above-indentified patent and that said Letters Patent is hereby corrected as shown below:

Column 4, line 9, change "sprovided" to -- provided--.

Column 5, line 17, change "control led" to --controlled--.

Signed and Sealed this

Twenty-first Day of January, 1997

Attest:

BRUCE LEHMAN

Attesting Officer     Commissioner of Patents and Trademarks